(12) United States Patent
Burger

(10) Patent No.: US 7,856,700 B2
(45) Date of Patent: Dec. 28, 2010

(54) DEVICE FOR REPEATEDLY MACHINING ADJACENT WORKPIECES

(76) Inventor: Manuel Burger, 32B Kingsland Road, London (GB) E2 8DA ( * ) Notice: Subject to any disclaimer, the term of this patent is extended or adjusted under 35 U.S.C. 154(b) by 278 days.

(21) Appl. No.: 12/095,332

(22) PCT Filed: Nov. 23, 2006

(86) PCT No.: PCT/EP2006/011217

§ 371 (c)(1),
(2), (4) Date: Jul. 17, 2008

(87) PCT Pub. No.: WO2007/062774

PCT Pub. Date: Jun. 2, 2007

(65) Prior Publication Data

US 2009/0025452 A1    Jan. 29, 2009

(30) Foreign Application Priority Data

Dec. 1, 2005    (DE) ................... 10 2005 057 658

(51) Int. Cl.
*B23P 23/00*   (2006.01)
*B23C 1/04*   (2006.01)
*B23Q 3/157*   (2006.01)

(52) U.S. Cl. .................. 29/27 C; 409/235; 483/14; 483/19; 483/30

(58) Field of Classification Search .............. 29/27 C; 483/14, 19, 30; 409/235
See application file for complete search history.

(56) References Cited

U.S. PATENT DOCUMENTS 4,949,443 A * 8/1990 Saruwatari et al. .......... 29/27 C
5,885,199 A * 3/1999 Shao ........................ 483/19

6,447,225 B1    9/2002   Green (Continued)

FOREIGN PATENT DOCUMENTS

DE    42 12 468 A1    10/1993

(Continued)

OTHER PUBLICATIONS

International Preliminary Report on Patentability fpr PCT/EP2006/011217.

(Continued)

*Primary Examiner*—David B Jones
(74) *Attorney, Agent, or Firm*—Martin Fleit; Paul D. Blanco; Fleit Gibbson Gutman Bongini & Bianco PL

(57) ABSTRACT

The invention relates to a device for repeatedly machining workpieces (1), especially bar-shaped or tubular workpieces, which are located next to each other. Said device comprises a bottom part (2) for supporting the workpieces (1), a top part (3) that can be drivingly moved relative to the bottom part (2) in order to mount the workpiece on the bottom part (2), and a tool support (24) for receiving several tools. In order to be able to universally use the device, the tool support (24) is equipped with a support plate (29) which can be drivingly displaced relative to the bottom part (2) and encompasses several tool receptacles (30) for axial tools (25), said tool receptacles (30) being arranged next to and underneath each other. A drive unit (26) is allocated to the tool support (24) in order to actuate the axial tools (25).

13 Claims, 3 Drawing Sheets

U.S. PATENT DOCUMENTS

| | | | |
|---|---|---|---|
| 6,949,056 B2 * | 9/2005 | Soroka et al. | 483/14 |
| 7,179,030 B2 * | 2/2007 | Krosta et al. | 409/235 |
| 7,331,099 B2 * | 2/2008 | Horn et al. | 29/563 |
| 7,621,030 B2 * | 11/2009 | Lombacher et al. | 29/27 C |
| 2004/0132595 A1 * | 7/2004 | Grob | 483/30 |
| 2006/0048361 A1 * | 3/2006 | Corbean et al. | 29/27 C |

FOREIGN PATENT DOCUMENTS

| | | |
|---|---|---|
| DE | 198 60 867 A1 | 7/2000 |
| DE | 10 2004 001 149 A1 | 8/2005 |
| DE | 10 2004 030 150 A1 | 1/2006 |
| EP | 0 100 291 | 2/1984 |

OTHER PUBLICATIONS

Written Opinion of the International Searching Authority for PCT/EP2006/011217.

International Search Report for PCT/EP2006/011217.

* cited by examiner

DEVICE FOR REPEATEDLY MACHINING ADJACENT WORKPIECES

BACKGROUND OF THE INVENTION

1. Field of the Invention

The invention relates to a device for repeatedly machining several workpieces arranged one next to the other, in particular, bar-shaped or tubular workpieces. With such a device, several workpieces to be machined can be, e.g., bent, punched, perforated, enlarged, provided with threads and screws, flattened, and also tested.

2. Prior Art

Such processes, as noted above, are typically performed in separate final processing machines and connected presses. For mass-produced parts, these are combined in large-scale transfer installations, wherein then only one work process is performed for each final processing station. For all of the other processes and inspections, a single, separate processing device is then used. Therefore, relatively large and complicated installations result. In contrast, for small-batch and medium-batch production, as a rule, final processing stations with a workpiece clamp and an axial revolver are used for the axial tools. Here, however, because the processes are performed one after the other, a relatively long cycle time results. Such processing devices are therefore not economical for larger batches.

SUMMARY OF THE INVENTION

The problem to be solved by the invention is to devise a device for repeated machining of the type named above, which can be used economically for both smaller batches and large batches.

This problem is solved by the present invention by providing a device for repeatedly machining workpieces, especially bar-shaped or tubular workpieces, which are located next to each other. The device comprises a bottom part for supporting workpieces, a top part that can be drivingly moved relative to the bottom part. The workpiece is mounted on the bottom part, and a tool support receives several tools. To universally use the device, the tool support is equipped with a support plate which can be drivingly displaced relative to the bottom part. The tool support also encompasses several tool receptacles for axial tools. The tool receptacles are arranged next to and underneath each other. A drive unit is drivingly connected to the tool support to actuate the axial tools. Preferred refinements and advantageous embodiments of the invention will become apparent from the following detailed description.

In the device according to the invention, several workpieces are arranged one next to the other and clamped between a bottom part and a top part, which move centrally and which is constructed, e.g., as a press slide. The device contains a tool support, which contains a support plate that can move relative to the bottom part and which has several tool receptacles arranged one next to the other and one above the other for axial tools. A drive for actuating the axial tools is connected to the tool support. In this way, arbitrary processes can be performed at the same time on several processing stations and/or one after the other through axial tools lying one above the other. Thus there is the possibility of combining parallel and successive production steps arbitrarily. In this way, a combination of the advantages of large-batch and small-batch production installations is possible. Through the simple displacement of the support plate constructed like a tool register, the workpieces can also be processed in several steps at the individual processing stations without complicated tool exchange.

In an especially preferred construction of the invention, the top part of the device is guided so that it can move vertically by means of two side cheeks connected rigidly to the top part on two side parts of a frame. The side cheeks extend essentially across the entire height of the side parts and are guided across their entire or nearly entire length. This enables an especially stable and exact guidance of the top part.

The support plate of the device can also be easily adapted to different requirements through expansion. It can be constructed, e.g., in one piece or from several segments that can also move separately. The device according to the invention also has an extremely compact and simple construction, which enables high production rates. The drive for actuating the axial tools is advantageously formed by a traverse, which can move horizontally on a frame and which is driven by a servomotor. In a preferred construction, the lifting drive for moving the top part contains a drive shaft, which is mounted so that it can rotate in the bottom part and which can be rotated by a motor, with eccentric pins, which each engage in an elongated hole of the side cheeks by means of a sliding piece. However, other suitable lifting drives could also be provided. In the bottom part and/or the top part, additional drives for the workpiece machining can also be housed.

Additional details and advantages of the invention will become evident from the following description of a preferred embodiment with reference to the drawing.

DETAILED DESCRIPTION OF PREFERRED EMBODIMENTS

Figure 1:
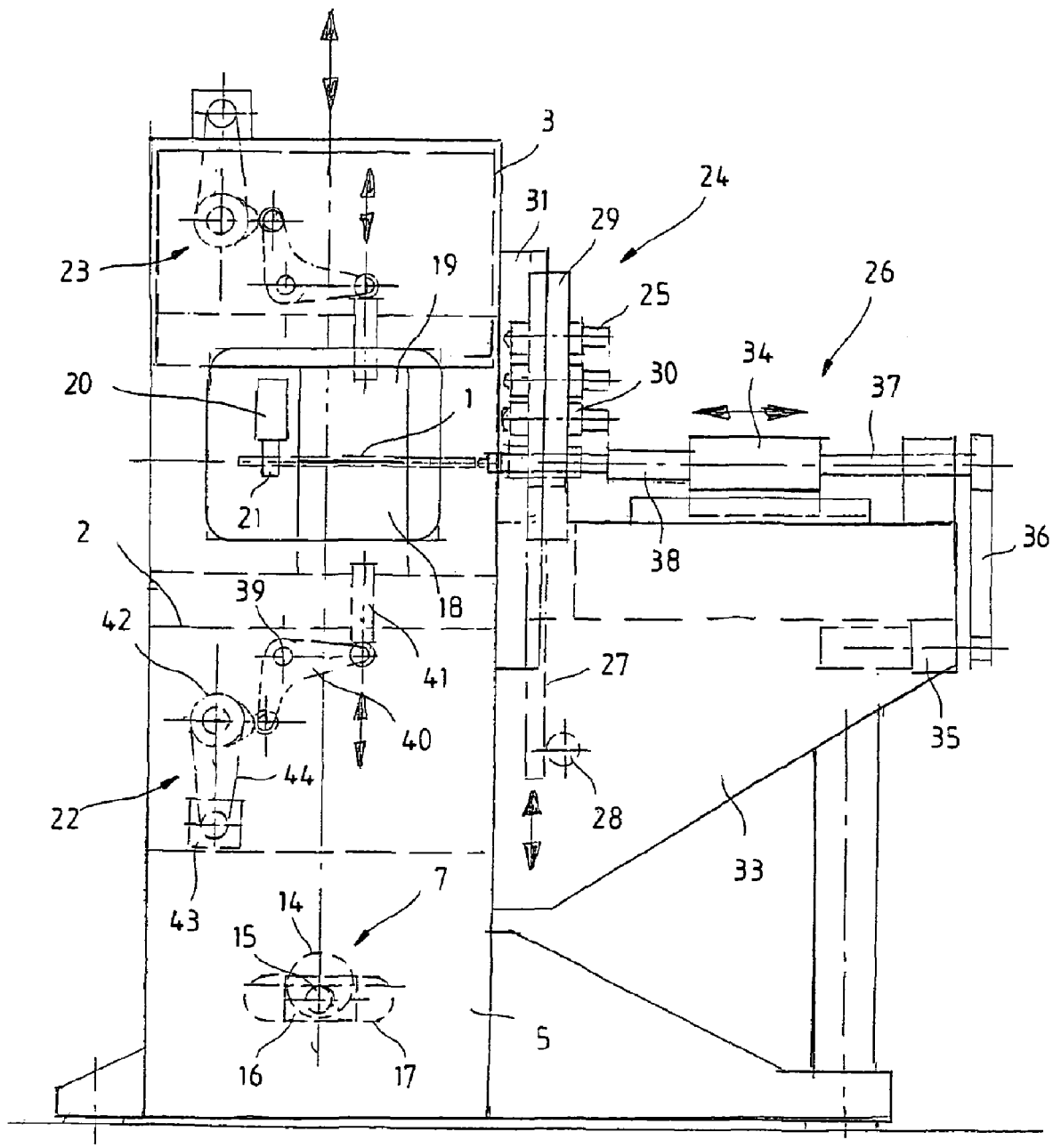
FIG. 1 is a schematic side view of the device according to the invention for repeatedly machining several workpieces arranged one next to the other.
Figure 2:
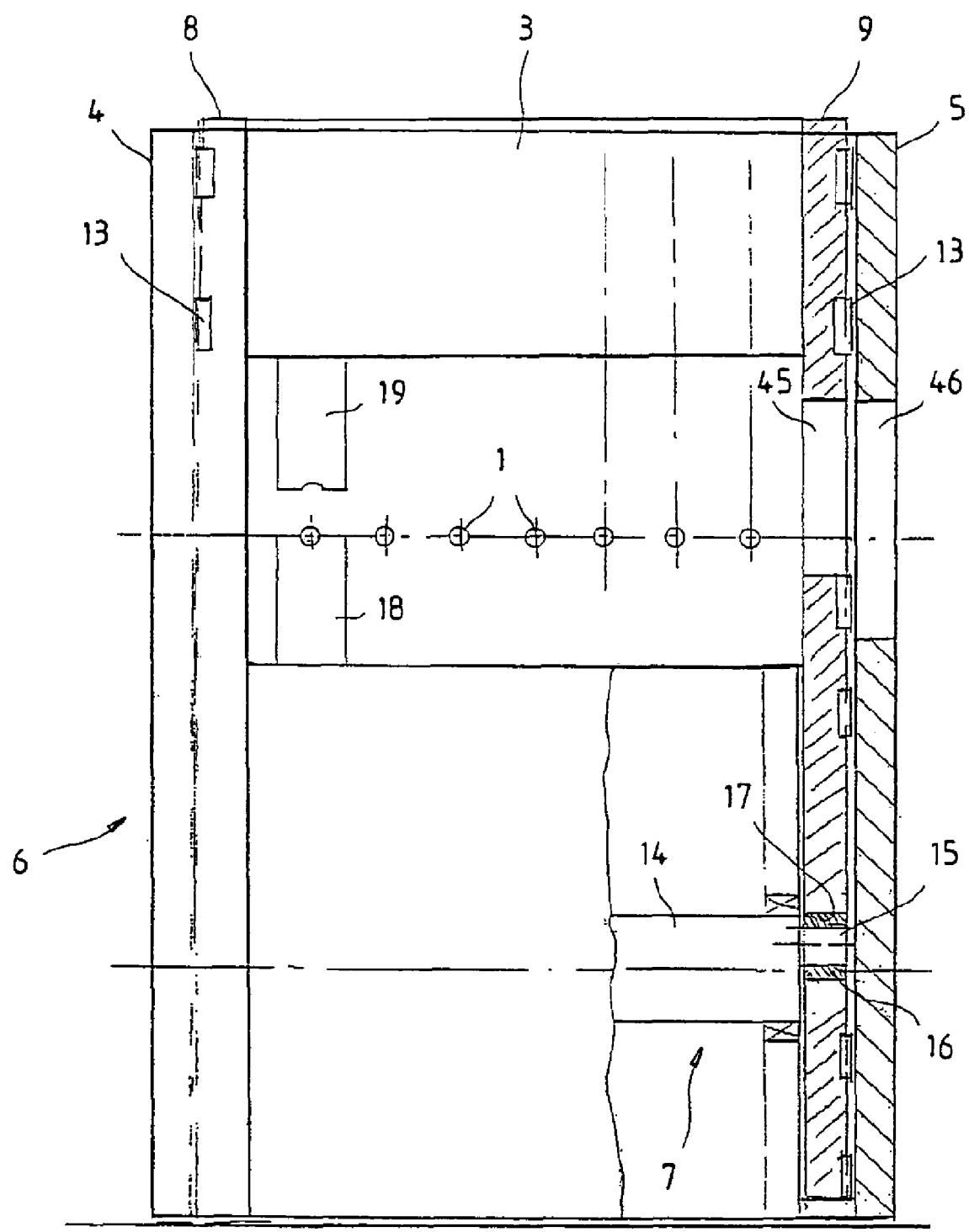
FIG. 2 is a partially sectioned front view of the device shown in FIG. 1.

The device for repeatedly machining several workpieces 1 arranged one next to the other is shown schematically in a side and front view in FIGS. 1 and 2. The device is designed, in particular, for the complete machining of bar-shaped or tubular workpieces, e.g., for manufacturing belt and lock tightener pipes, brake and fuel lines, fuel filler pipes, injection lines, and the like. The device is comprised of a bottom part 2 and a top part 3, which is constructed as a press slide and which is guided so that it can move between two side parts 4 and 5 of a frame 6 relative to the bottom part 2 and which is movable vertically by a lifting drive 7.

Figure 4:
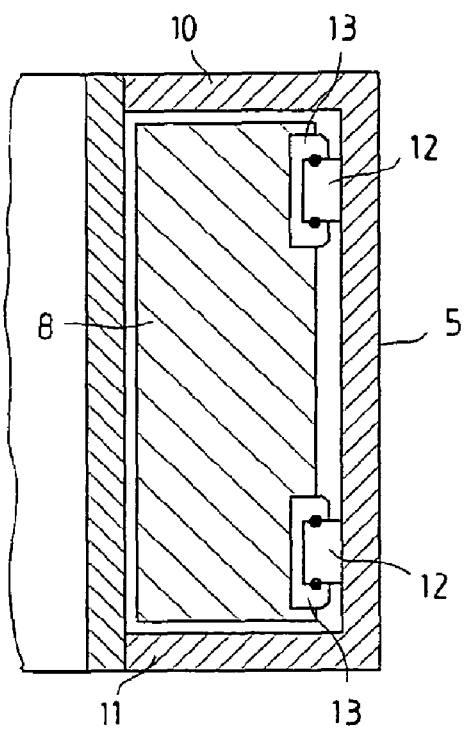
FIG. 4 is an enlarged partial view of a side cheek guide.

As seen in FIG. 2, the top part 3, constructed as a press slide, is arranged so that it can move vertically by means of two side cheeks 8 and 9 connected rigidly to top part 3 on the two side parts 4 and 5 of the frame 6. In the shown embodiment, the two side parts 4 and 5 have a U-shaped cross section that can be seen in FIG. 4 with two legs 10 and 11 projecting inwards. Between the two legs 10 and 11 of the side parts 4 and 5, the side cheeks 8 and 9 are guided so that they can move by means of linear guides. The linear guides are made from guide rails 12 and associated guide shoes 13, which are arranged on the side parts 4 and 5 or the side cheeks 8 and 9. The side cheeks 8 and 9 extend across the entire height of the two side parts 4 and 5 and are guided nearly across the entire length. In this way, an especially stable and exact guidance of the top part 3 is achieved.

According to FIGS. 1 and 2, the lifting drive 7 for moving the top part 3 includes a horizontal drive shaft 14, which is mounted so that it can rotate in the bottom part 2 and which is driven by a motor and which contains eccentric pins 15 extending laterally at their two ends. These eccentric pins 15 each engage via a sliding piece 16 in an elongated hole 17 of the corresponding side cheeks 8 and 9. Thus, by rotating the drive shaft 14, the top part 3 is shifted by means of the side cheeks 8 and 9 relative to the bottom part 2.

On the bottom part 2 and on the top part 3, several bottom and top workpiece holders 18 and 19, respectively, are arranged one next to the other—shown only schematically in FIGS. 1 and 2—between which the workpieces 1 are held and/or processed. Between the bottom part 2 and the top part 3 there are several processing stations, which are arranged one next to the other and in which the workpieces 1 are processed in successive steps. The transport of the workpieces 1 from one processing station to the next is realized by a transfer rail 20, which is shown in FIG. 1 and which is provided with corresponding grippers 21.

The workpiece holders 18 and 19 can be easily exchanged by not-shown holding rails and locking pins. The lower workpiece holder 18 can be constructed, e.g., as a hollow shape and the upper workpiece holder 19 can be constructed as a counterpart to the hollow shape. They are used for deforming and/or fixing the workpiece 1 during the processing, but can also include additional processing devices or tools, through which the workpieces 1 are processed either by means of the downwards movement of the top part 3 or by additional drives in the bottom part 2 and/or the top part 3. Thus, additional drives 22 and 23, which are shown with dashed lines in FIG. 1 and through which punching, stamping, perforating, or other processing devices can be activated in the tool holders 18 and 19, can be housed in the top part 2 and in the bottom part 3. On the back side of the frame 6, a tool support 24 shown in FIG. 1 is mounted for receiving axial tools 25 for the final processing of workpieces 1 and also an associated drive 26. The tool support 24 contains a support plate 29, which is adjustable in height by means of a toothed rack 27 and a drive pinion 28 and which contains several tool receptacles 30 arranged one next to the other and one below the other for the axial tools 25.

Figure 3:
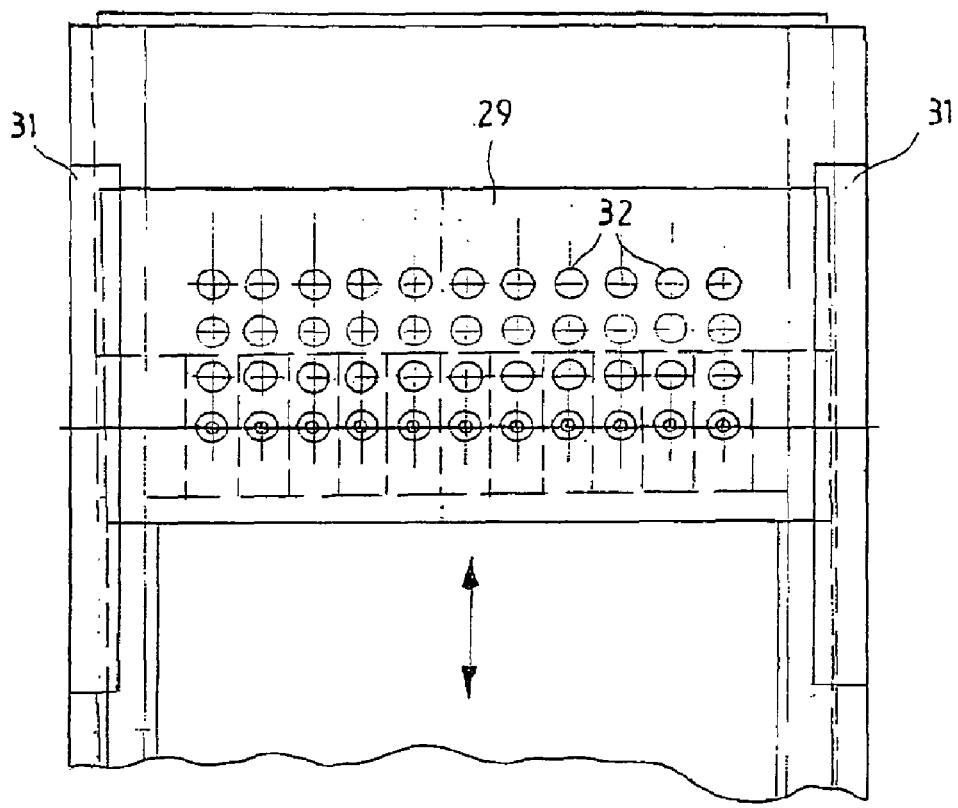
FIG. 3 is a rear view of the device shown in FIG. 1 showing a tool support.

In FIG. 3 it can be seen that the support plate 29 is guided so that it can move vertically between two lateral guide bars 31. It contains several openings 32, which are arranged one next to the other and one above the other and in which the tool receptacles 30 are arranged for the axial tools 25. The lateral spacing of the openings 32 in each row corresponds to the spacing of the workpieces 1 in the processing stations arranged one next to the other, so that several workpieces 1 can be processed on the back side. For each workpiece 1, there are also several tool receptacles 30 arranged one under the other for different axial tools 25. The support plate 29 can have a one-piece or multiple-piece construction.

The drive 26 shown in FIG. 1 for the axial tools 25 arranged in the support plate 29 contains a traverse 34, which is guided so that it can move horizontally on a frame 33 and which can be moved horizontally by a servomotor 35 by means of a drive belt 36 and two parallel drive spindles 37. In the traverse 34 there are horizontal receptacle openings lying one next to the other for activation elements 38 for activating the axial tools 25. The receptacle openings for the activation elements 38 are arranged in such a way that these align with the tool receptacles 30. The horizontal spacing of the receptacle openings is adapted to the lateral spacing of the openings 32 for the tool receptacles 30. By shifting the traverse 34, the tools arranged in the support plate 29 can be activated.

The additional drives 22 and 23 likewise shown in FIG. 1 include a rocking lever 40, which can pivot about a rotational axis 39 and which is in contact with one end with a tappet 41 and with the other end with a cam plate 42. The cam plate 42 provided with one or more cams is driven by a motor 43 by means of a belt 44. By rotating the cam plate 42, the tappet 41 can be moved in the axial direction and, e.g., a punching, stamping, or bending tool integrated in the tool holder can be activated.

In the following, the function of the device described above will be explained.

The feeding of the workpieces 1 to be machined can be realized from a not-shown parts bin, from the bar, or from a coil after having been separated. By means of the transfer rail 20, which is provided with the gripper 21 and through which extend lateral passages 45 and 46 shown in FIG. 2 in the side parts 4 or 5 and side cheeks 8 or 9, the workpieces 1 are transported in sync from one processing station to the next. After placement of the workpieces 1 on the lower workpiece holders 18, the top part 3 constructed as a press slide is moved downward with the upper workpiece holders 19 attached to this top part through rotation of the drive shaft 14. Here, just through the closing motion of the upper workpiece holders 19, processing can take place, wherein the workpieces 1 are fixed by means of a hold-down clamp guiding the upper workpiece holders. The machining, however, can also be performed only after the closing of the upper workpiece holders 19 by tools integrated in the workpiece holders. Theses tools are activated by the additional drives 22 and 23 arranged in the bottom part 2 and/or in the top part 3 by means of the tappet 41 activating the tools. The movement of the tappet 41 is generated by means of the cam plate 42 and the rocking lever 40 driven by the motor 43. The cam plate 42 can include, on its periphery, several cams, which allow additional individual movement for different processes.

The final processing of the workpieces 1 is realized by the axial tools 25 arranged in the support plate 29. These tools can involve tools for stamping, enlarging, flattening, etc., but also tools for the production of threads, for the mounting of nuts, for testing, or the like. The movement for activating the axial tools 25 is generated by shifting the traverse 34. The axial tools themselves are supported in the tool receptacles 30 of the support plate 29.

If, with the aid of the traverse 34 an axial lift is realized, the traverse 34 can be moved back and the support plate 29 can be shifted up or down into a next tool position. Thus, also without complicated tool exchange, successive work processes can be performed at one processing station and/or simultaneously at different processing stations. For shorter workpieces, a turning station can also be provided, through which the workpieces are turned for processing at both ends. For longer workpieces, two devices can be set opposite each other in such a way that processing is possible at both ends. When processing has ended, the workpieces 1 are first fixed with the aid of the gripper 21 attached to the transfer rail 20 before the top part 3 is moved upward. After opening the top part 3, the workpieces 1 are removed from the lower workpiece holder 18 by the gripper 21 arranged on the transfer rail 20 and transported to the next processing station. For simpler processing, processing stations can also be skipped. Then a new processing cycle can begin.

By the device described above, complete processing from the coil up to the complete workpiece can be performed, wherein, in addition to the final processing, other processing steps, such as, e.g., punching, stamping, bending, testing, and the like, are also possible. The device is extremely flexible and can be used universally.

The invention claimed is:

1. Device for repeatedly machining of a plurality of workpieces (1) arranged one next to the other comprising a frame (6) including two side parts (4, 5), a bottom part (2) for supporting the workpieces (1) mounted in said frame, a top part (3) including two side cheeks (8, 9) connected rigidly to the top part (3) that are guided on said two side parts (4, 5) of the frame (6) so that the top part (3) is movably mounted in said frame relative to the bottom part (2), a lifting motor mounted on said frame operatively connected to move said top part (3) relative to said bottom part (2), a tool support (24) for receiving several tools mounted on said frame, said tool support (24) including a support plate (29) mounted for movement relative to the bottom part (2), a first drive operatively connected to said support plate (29) for moving said support plate (29) relative to said bottom part (2), said support plate (29) having with several a plurality of tool receptacles (30) arranged one next to the other and one under the other for holding axial tools (25), a second drive (26) for activating axial tools (25) held in said tool receptacles (30), and the top part (3) being constructed for holding workpieces (1) on the bottom part (2).

2. Device according to claim 1, wherein the support plate (29) is guided to move vertically on frame (6) and includes a plurality of rows of tool receptacles (30) lying one above the other.

3. Device according to claim 1, wherein the side cheeks (8, 9) extend essentially across the entire height of the side parts (4, 5) and are guided nearly across their entire length.

4. Device according to claim 1, wherein the support plate (29) is one of unitary construction and composed of individually driven segments.

5. Device according to claim 1, wherein the spacing of the tool receptacles (30) arranged one next to the other corresponds to the spacing of the workpieces (1) arranged on the bottom part (2).

6. Device according to claim 1, wherein the second drive (26) for activating the axial tools (25) includes a traverse (34), guided to move horizontally on said frame and a servomotor (35) to drive said traverse (34).

7. Device according to claim 6, wherein the traverse (34) is driven by the servomotor (35) by means of a drive belt (36) and two parallel drive spindles (37).

8. Device according to claim 6, wherein receptacle openings lying one next to the other in the traverse (34) further include activation elements (38) for activating the axial tools (25).

9. Device according to claim 1, wherein the lifting motor includes a drive shaft (14), supported to rotate in the bottom part (2) and eccentric pins (15) that each engage in an elongated hole (17) of the side cheeks (8, 9) by means of a sliding piece (16).

10. Device according to claim 1, wherein several top and bottom workpiece holders (18, 19) arranged one next to the other are mounted on the bottom part (2) and the top part (3).

11. Device according to claim 1, wherein additional drives (22, 23) for tool activation are arranged in the bottom part (2) and/or the top part (3).

12. Device according to claim 11, wherein the additional drives (22, 23) include a tappet (41), which can be shifted shiftable in an axial direction and activated by a cam plate (42) that is rotated by a motor by means of a rocking lever (40) that can pivot about a rotational axis (39).

13. Device according to claim 1, wherein a transfer rail (20) provided with grippers (21) is arranged between the bottom part (2) and the top part (3) for transporting workpieces.

* * * * *